Dec. 15, 1925.

C. BOUIN 1,565,897

CAMERA AND FILM INDICATOR

Filed Nov. 6, 1923　　2 Sheets-Sheet 1

INVENTOR:
Charles Bouin.

Dec. 15, 1925.
C. BOUIN
1,565,897
CAMERA AND FILM INDICATOR
Filed Nov. 6, 1923     2 Sheets-Sheet 2
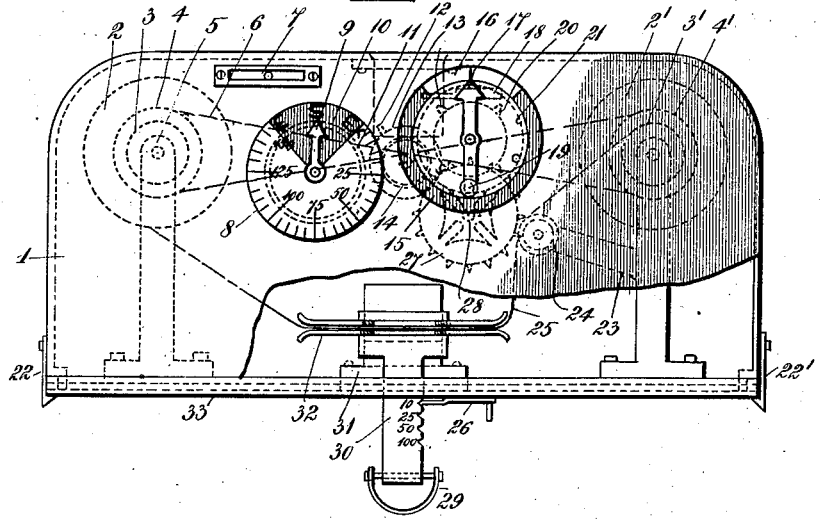
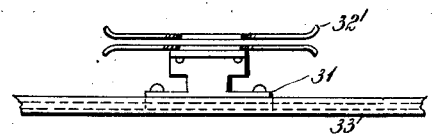
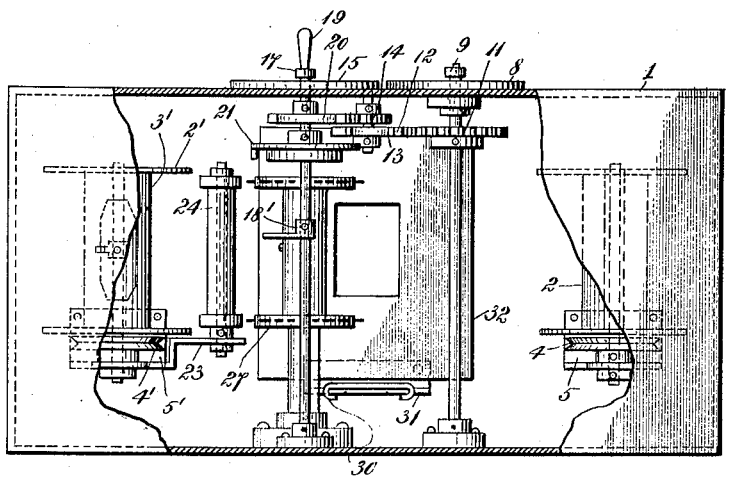
INVENTOR=
Charles Bouin Patented Dec. 15, 1925.

1,565,897

UNITED STATES PATENT OFFICE.

CHARLES BOUIN, OF BOSTON, MASSACHUSETTS.

CAMERA AND FILM INDICATOR.

Application filed November 6, 1923. Serial No. 673,158.

*To all whom it may concern:*

Be it known that CHARLES BOUIN, a citizen of the United States, residing at 700 Tremont Street, in the city of Boston, in the county of Suffolk and State of Massachusetts, has invented certain new and useful Improvements in Camera and Film Indicators, of which the following is a specification.

The present invention relates to improvements in camera and film indicator.

With this camera a series of unrelated pictures may be taken to be finally viewed by means of the viewing apparatus.

Also, with this camera a series of related pictures may be taken for the final purpose of being viewed by means of the viewing apparatus; the series of related pictures being so photographed by the camera and viewed by means of the viewing apparatus in such a manner that the motion effect is entirely eliminated.

That the elimination of the so-called motion of motion pictures has advantages will be shown presently.

In ordinary motion pictures, 16 pictures are projected per second; 16 pictures represent one foot of film; one foot of film projected every second would equal 60 feet of film per minute, which would equal 3,600 feet of film projected per hour and 3,600 feet of film would equal 57,600 pictures projected per hour. This great amount of pictures and number of feet of film for one hour's view being necessary simply for the purpose of creating the sensation of motion in the pictures.

It must here be realized the great amount of film necessary simply for the purpose of adding so-called "lifelike motion" to a series of pictures known as "motion pictures".

This "motion" of pictures is no longer a novelty to the public, in a sense.

It is the story, drama or otherwise, which we become interested in nowadays, the story that the pictures portray, the same as reading a story from a book, with this difference, in the case of a book the story is presented to the mind by means of printed words and in the case of motion pictures the story is presented to the mind by means of a series of printed related pictures, which is given a sensation of motion.

If we start reading a book and the words create interesting thoughts to the mind we continue reading, if not we discontinue.

If we go to a "movie" and the projected pictures create interesting thoughts to the mind we continue watching the projeced pictures, and if the pictures are not interesting to the mind it is painful to see the picture "through" and the interest is lost. So, then, when the story told by pictures is of no interest, no one can enjoy the motion itself independent of the picture, unless a person has never seen a "motion picture" before.

Now the object of this invention is neither a book or motion pictures, but certain qualities of each, the advantages of which will be apparent.

This camera "takes" one picture per second from which negative film a positive film is printed and viewed in the viewing apparatus at the rate of one picture per second, or approximately.

Such a method will eliminate the "motion" effect of the pictures, which it is purposely intended to do.

One picture per second would equal 60 pictures per minute; 60 pictures per minute would equal 3,600 pictures per hour.

This method per hour = 3,600 pictures or 225 feet of film.

Motion picture method = 57,600 pictures or 3,600 feet of film.

In this method of presenting a story only $\frac{1}{16}$ the amount of film is consumed and even less than this amount is used when we stop to consider the reading matter accompanied with motion pictures. Assume a motion picture film of 3,600 feet to contain 8 different sections of reading matter 10 feet each, which is probably a low estimate; this would equal 80 feet of reading matter; the reading matter of this 80 feet of film would be represented in this invention by exactly ½ foot of film with a resulting ratio of 160 to 1 for reading matter, and any length of time could be taken to read said sections as desired, which in motion pictures is too short to be carefully read.

In the method of this invention the "motion" is taken out of a series of corelated pictures and it is apparent that a great amount of film is saved, and the bulkiness is also considerably decreased and both of these to such an extent that it becomes commercially practical for a person to have a number of stories in pictures for home use at a small expense, especially if the pictures were printed upon a paper roll, without interfering with motion picture theatres or producers for the reason of the two being of such a different nature; producers could print reels from their regular old negatives (a print from every 16th picture), without interference with the motion picture trade, etc.

In the method of this invention, a story could be told in pictures practically as complete as in "motion pictures" without the loss of any expression of the actors of the story.

In motion pictures the excessive amount of pictures is for the effect of motion.

Although the effect of motion is eliminated in this invention, it can be readily understood that when a picture is taken every second = 60 times per minute, practically nothing is lost in the line of gestures, positions or expressions of the actors, as it is apparent the actors cannot make any radical change in gestures, positions or expressions as fast as 60 times per minute.

A story told by this method, with 225 feet of film, which also allows stopping at any point of the story for a prolonged viewing of any particular picture or reading matter as desired, is equal to 3,600 feet of film of which 3,375 approximately is for the purpose only of creating a sense of motion; and in motion picture projection no stopping for prolonged viewing at any point of the story is allowable, on account of fire risks and the like, etc.

In this method the story would be efficiently told by a series of related pictures intermittently presented to the eyes and at such intervals between each picture as to prevent "flicker" and "motion" of pictures.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a plan view, with parts broken away, of an apparatus constructed according to the present invention.

Fig. 4 is a plan view, partly broken away, and showing a modified form of the invention.

Fig. 5 is a detached fragmentary view of the base plate or cover with the film gate attached, and Fig. 6 is a side view with a portion of the cover broken away showing the interior construction.

Figure 1:
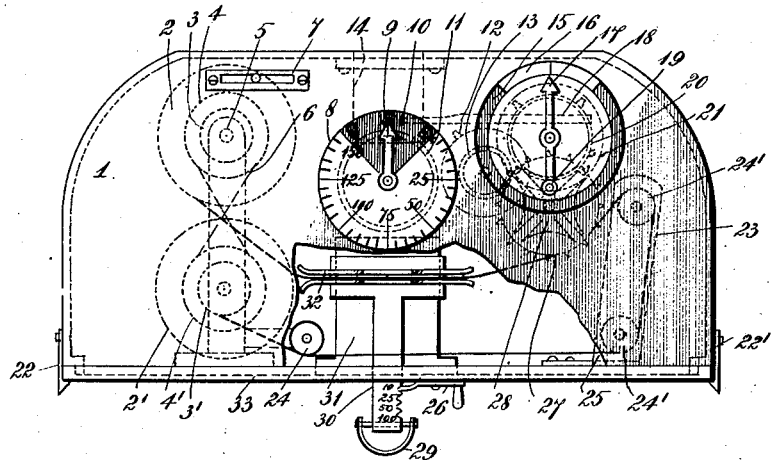
Figure 2:
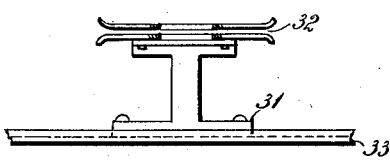
Fig. 2 is a detached view of the base plate removed with the film gate.
Figure 3:
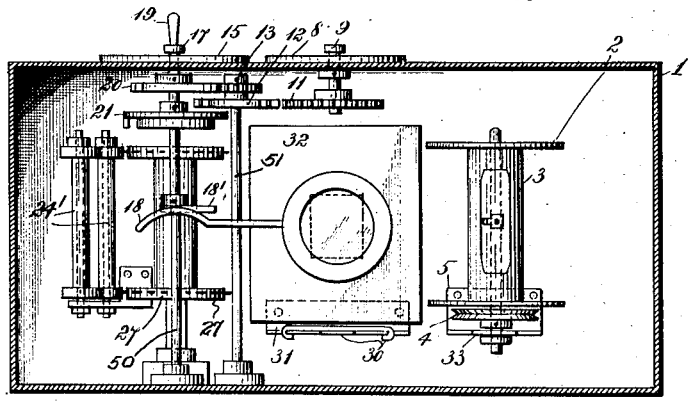
Fig. 3 is a section taken through the casing, this view being turned around with respect to Fig. 1.

The form of the invention shown in Figs. 4, 5 and 6 is similar in principle and general constructional aspects to the preferred form of the invention shown in Figs. 1, 2 and 3, and the differences between the two forms lie largely in changes in relative locations of the several mechanisms and parts. Similar reference numerals are used in each case as it is thought it will be clearer and less voluminous to adopt this plan.

In the drawings, 1 indicates the casing secured removably as by the clips 22 and 22′ to the base plate or cover 33. Within the casing and carried by the base plate 33 are the film spools 3 and 3′ provided with the usual flanges 2 and 2′ and associated with the grooved wheels 4 and 4′ engaged by the crossed belt 6. The spools are journaled upon shafts 5 in brackets which extend to the base plate 33 and in the form of the invention shown in Figs. 1, 2 and 3 the film rolls or spools are situated at the same side of the casing and one beside another whereas in the form shown in Fig. 4 the film spools are carried by individual pedestals upon the base plate 33 and are at remote ends of the casing.

The film as indicated extends from the spool 3 to and through the film gate 32, after which it is engaged by the toothed driving wheels 27. It is thence returned to the rewind spool 3, being directed in its course by the guide rollers 24 and 24′, which are also carried as a unit with the base plate 33.

The film gate 32 is adjustably carried upon a block or pedestal 31 affixed to the base plate 33, and in this pedestal the film gate is slidably mounted for changing its focal position. A notched and graduated bar 30 extends from the film gate, being provided with a handle 29 for manipulation and adjustment, and engaging the stop 26 carried by the base plate, said stop being provided with a handle for the purpose of shifting it in and out of engagement with the notched portion of the bar 30.

The motion is communicated to the film by the means of a handle 19 extending upon the exterior of the casing 1, this handle being adapted to drive a shaft 50 journalled transversely of the casing above the toothed wheels 27 which engages the perforated margins of the film. A gear wheel 20 on the shaft 50 engages a pinion 13 upon a counter shaft 51 also journalled in the casing and carrying a gear wheel 12 in mesh with a gear wheel 11 upon the pointer shaft 9, which projects through the central part of the casing 1. The pointer 9 is adapted to move over a dial produced upon the casing with its center coinciding with the center of the pointer shaft. This dial is marked off in graduation as indicated, and the graduations are upon an unshaded portion of the dial which extends outside of the shaded segment 10. At the top of the shaded segment 10 is a letter "S", which indicates the starting and also the stopping point of the film. At the right hand side of the shaded segment are the letters "E X" indicating that exposure takes place when the pointer arrives at this point and begins its traverse about the unshaded portion. This indicator is used in conjunction with a photographic film such as is described and claimed in my Patent No. 1,498,434, granted June 17, 1924, in which the film strip is provided with opaque portions at each end. As the initial opaque portion of the film unwinds, the pointer 9 proceeds from the center of the shaded portion to the end marked "E X" and the exposure then begins continuing around to the opposite side of the shaded portion and to the designation "E". The exposure here ends and the traverse of the pointer 9 from the designation "E" to the central designation "S" marks the passage of the final opaque portion of the film strip.

The shaft 50 also carries the intermittent gear 21, which engages periodically or upon each revolution with the Maltese cross or Geneva gear 28. This Geneva gear drives the sprockets 27.

The shaft 50 also carries an arm 18 adapted to engage at each revolution the rounded free end of the shutter moving arm 18. At each revolution of the shaft 50 the arm 18' will engage the arm 18 and will cause the opening of the shutter for a predetermined interval.

Now, upon the exterior of the casing 1 and about the shaft 50 is a second indicator embodying an arrow or pointer 17, which moves over the dial represented by the shaded or colored ring 15, which is interrupted at its upper portion by the unshaded arc 16. The gearing is so timed and arranged in conjunction with this second indicator that during the interval when the shutter is open and the exposure taking place, the index 17 will be traversing the unshaded arc 16, but during the time when the shutter is closed the index will be upon the shaded portion of the ring 15.

The casing 1 also carries a spirit level 7 and the other adjuncts of the moving picture machine.

The film spools, film gate and the guide spools 24 and 24' are all withdrawable from the casing with the base plate 33, which makes it convenient to mount the new spools in place, to thread the film through the film gate and to engage it with the guide rolls and with the rewind spool. After this is accomplished, the base plate is returned to its place with the new film therein, and the clips 22 and 22' will engage and hold the base plate in the casing during the operation of taking the pictures.

The handle 19 is rotated continuously, but due to the Geneva movement, the film strip will only be fed intermittently. The shutter will be closed during the time that the film strip is in movement and as soon as the Geneva movement allows the film to come to rest with a picture before the aperture, the mechanism for opening the shutter will be brought into play so that the stationary picture may be taken or viewed as the case may be. The film indicator 8 may be so geared as to represent any reasonable number of exposures desired, or any reasonable length of opaque paper film covering at the ends of the film, and in the case illustrated, the indicator is arranged for 150 exposures, each mark representing five such exposures.

The other film indicator shows when the Geneva movement is causing the film strip to move across the aperture by the use of the shaded portion 15, and it further indicates the time of exposure by the unshaded part 16. In other words, this indicator shows when the shutter is closed and when open.

In Figs. 2 and 5 the film gate is shown as permanently and non-adjustably attached to the base plate 33. The lens is within the camera casing, and focusing is not accomplished by adjusting the lens. The lens shutter arm extension 18 and the actuating arm 18' are also encased.

When all of the film has been exposed, which is 150 exposures in this case, the index 9 points to 150 or "E" on the central indicator, which signifies the end of the photographic light sensitive part of the film and the beginning of the opaque paper section, and upon further turning of the handle 19 to the point "S", which will now denote the position of stop, this further signifies that the opaque paper section has been sufficiently advanced and wound about the sensitized portion of the film to allow the removal of the film roll in day light.

It is understood that the negative images made by the camera are made at the rate of 1 to each turn of the handle 19, and not more, and probably less than 60 per minute. From such a negative film positives are made and viewed in a similar viewing apparatus.

It is obvious that various changes and modifications may be made in the details of construction and design of the above specifically described embodiment of this invention without departing from the spirit thereof, such changes and modifications being restricted only by the scope of the following claims.

What is claimed is:

1. A camera of the kind described comprising means for holding a film strip having opaque end portions, a film gate for guiding the strip, means for receiving the film after exposure, a shutter for periodically exposing the film, means for driving said shutter, means for intermittently advancing the film, having two indicators, one indicator comprising a ring on topmost casing having a shaded and unshaded section and a pointer indicating the opaque end portions of the film and the sensitized portion of the film when in film gate aperture by means of a pointer revolving over the shaded and unshaded sections of ring, numerals on said unshaded section of ring indicating number of exposures made by means of said pointer, letters on said shaded section of ring indicating points of start, expose, end and stop and a second indicator on outside casing of camera, said indicator having a shaded and unshaded section over which a pointer revolves indicating when film is moving and shutter is closed and when film is at rest and shutter is open.

2. A camera of the character described comprising means for holding a film strip having opaque end portions, means for receiving the strip after exposure, a film gate for guiding the strip, a shutter for periodically exposing the strip, means for intermittently driving the film strip and also for opening and closing said shutter, and an indicator driven by said means, and consisting of a dial having a segment differing from the remaining portion of the dial, a pointer moving over the dial and indicating whenever said segment at the opaque portions of the film ends are in the film gate said indicator adapted to show position of the opening and closing of shutter and the travel of film, and a second indicator for indicating when the opaque film covering of the first section of film is in the film gate and when said section passes from the film gate aperture, said section indicator being also adapted to indicate the number of exposures made and when the end of the sensitized film is reached.

3. A camera of the character described comprising means for intermittently moving a film strip and for exposing said strip, having two indicators on outside of camera casing and jointly cooperating by means of gears on inside of said casing, both indicators driven by said means, each indicator having a ring of shaded and unshaded portions and a pointer to each indicator and said pointers moving over said rings in a circular direction, one pointer showing the open and closed positions of the shutter and the condition of movement or rest of either opaque film covering or sensitized film portion, and a second pointer showing the position of the first opaque film covering in relation to the film gate aperture, the sensitized film in relation to the film gate aperture, the number of exposures made and the opaque film covering at end of film in relation to film gate aperture.

In testimony whereof I affix my signature.

CHARLES BOUIN.